United States Patent [19]

DeLisser et al.

[11] Patent Number: 5,503,421
[45] Date of Patent: Apr. 2, 1996

[54] CLUTCH AND CONTROL MECHANISM FOR FIFTH WHEEL

[76] Inventors: Chrys O. DeLisser, 6328 Falling Star, El Paso, Tex. 79912; Thomas O. Summers, P.O. Box 27159, Albuquerque, N.M. 87125

[21] Appl. No.: 89,471

[22] Filed: Jul. 6, 1993

Related U.S. Application Data

[62] Division of Ser. No. 908,380, Jul. 6, 1992, Pat. No. 5,294,968.

[51] Int. Cl.⁶ ................................................. B62D 53/06
[52] U.S. Cl. ........................................ 280/441.1; 280/232
[58] Field of Search ...................................... 280/432, 433, 280/441.1

[56] References Cited

U.S. PATENT DOCUMENTS

| | | | |
|---|---|---|---|
| 2,188,727 | 1/1940 | Soulis | 188/3 |
| 2,201,353 | 5/1940 | Soulis | 280/432 |
| 2,667,364 | 1/1954 | Colpo | 280/432 |
| 2,692,145 | 10/1954 | Hammond, Jr. et al. | 280/432 |
| 2,804,314 | 8/1957 | Billingsley | 280/432 |
| 2,838,323 | 6/1958 | Coustillac | 280/116 |
| 2,854,253 | 9/1958 | Apgar | 280/432 |
| 3,063,739 | 11/1962 | Davies | 280/438 |
| 3,328,051 | 6/1967 | Hope et al. | 280/432 |
| 3,556,560 | 1/1971 | Adams | 280/415 |
| 3,874,699 | 4/1975 | Hayes et al. | 280/432 |
| 4,300,785 | 11/1981 | Mettetal | 280/432 |
| 4,463,341 | 7/1984 | Iwasaki | 340/310 A |
| 4,585,248 | 4/1986 | Miller et al. | 280/432 |
| 4,720,118 | 1/1988 | Schultz et al. | 280/432 |
| 4,784,403 | 11/1988 | Hawkins et al. | 280/432 |
| 4,898,399 | 2/1990 | Adams | 280/408 |

FOREIGN PATENT DOCUMENTS

| | | | |
|---|---|---|---|
| 1004247 | 1/1977 | Canada | 280/432 |
| 1710431 | 2/1992 | U.S.S.R. | 280/441.1 |

*Primary Examiner*—Margaret A. Focarino
*Assistant Examiner*—Victor E. Johnson
*Attorney, Agent, or Firm*—DeWitt M. Morgan; Kevin Lynn Wildenstein

[57] ABSTRACT

A rotatable fifth wheel mechanism for use on converter dollies, truck tractors, and permanently attached dollies. The mechanism includes: a fifth wheel supported on a frame for rotation about a vertical axis; and a clutch secured between the fifth wheel and the frame, to control rotation of the fifth wheel relative to the frame. The clutch includes a drum secured to the fifth wheel, friction pad completely surrounding the drum and an inflatable bladder for applying pressure to the friction pad. The fifth wheel mechanism also includes apparatus for increasing or decreasing the pressure in the bladder to selectively vary the engagement force between the drum and friction pads. The apparatus for selectively increasing or decreasing pressure includes at least a pair of electrically operated air valves. The fifth wheel includes at least one spring biased key (coupled to an automatic sensing device) which, when the fifth wheel is in proper alignment with the fifth wheel plate on a semi-trailer, engages with a mating slot in the fifth wheel plate. An electronic control package is also disclosed which includes apparatus for initiating a command, apparatus for encoding the command, apparatus for decoding the command and apparatus for implementing the command. The apparatus for encoding and the apparatus for decoding are interconnected by only a single wire (not counting the ground).

6 Claims, 12 Drawing Sheets

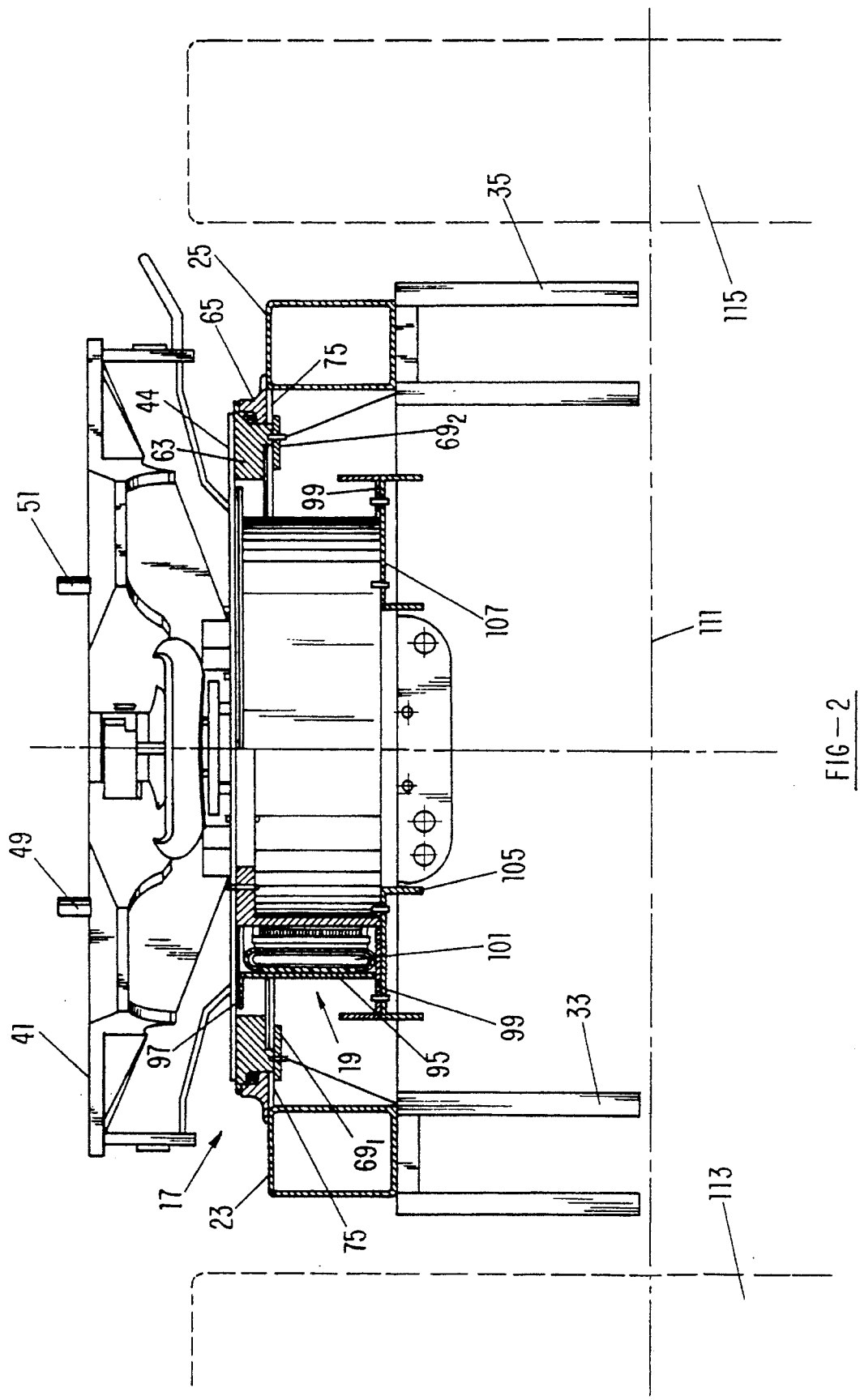

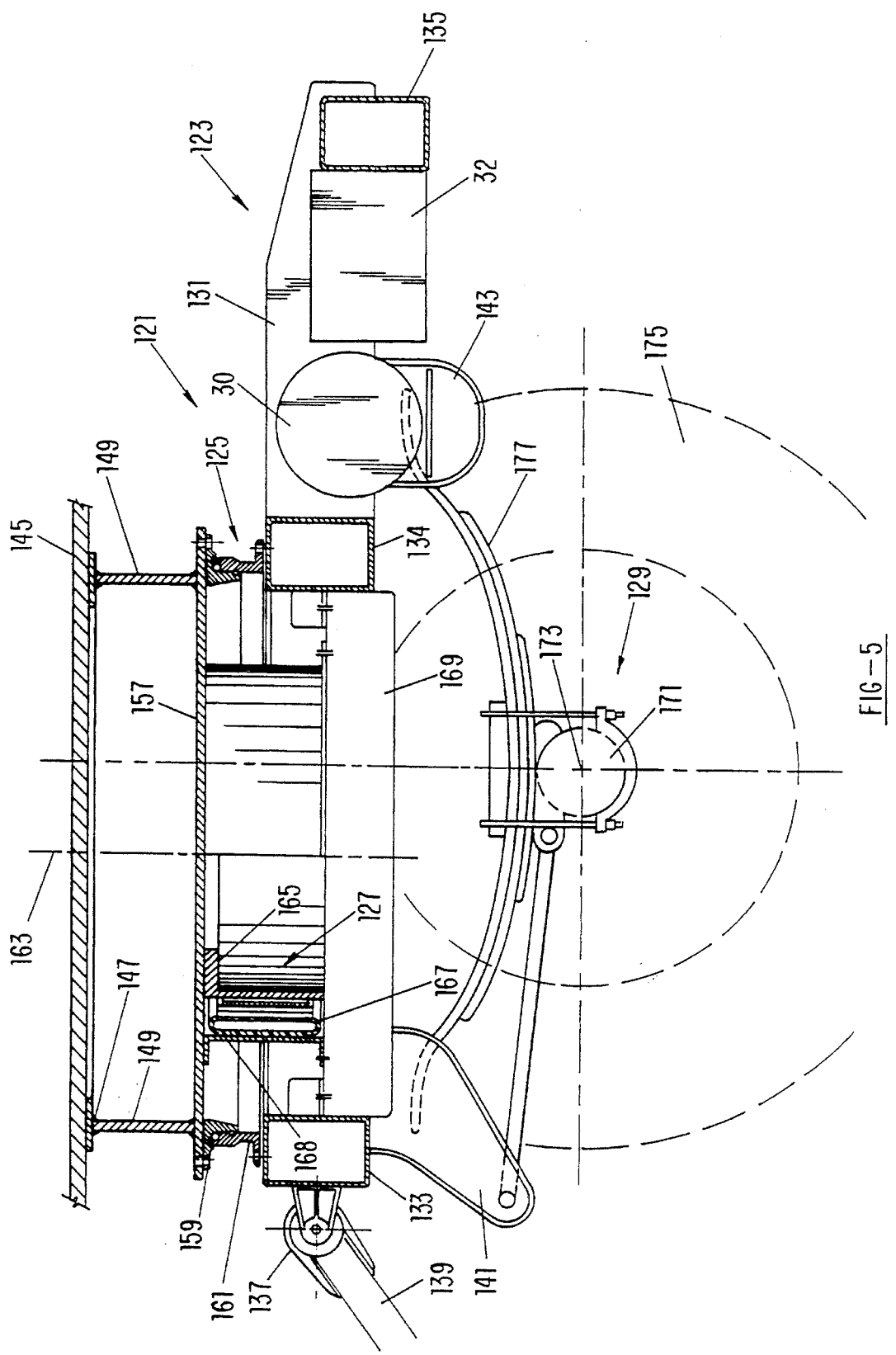

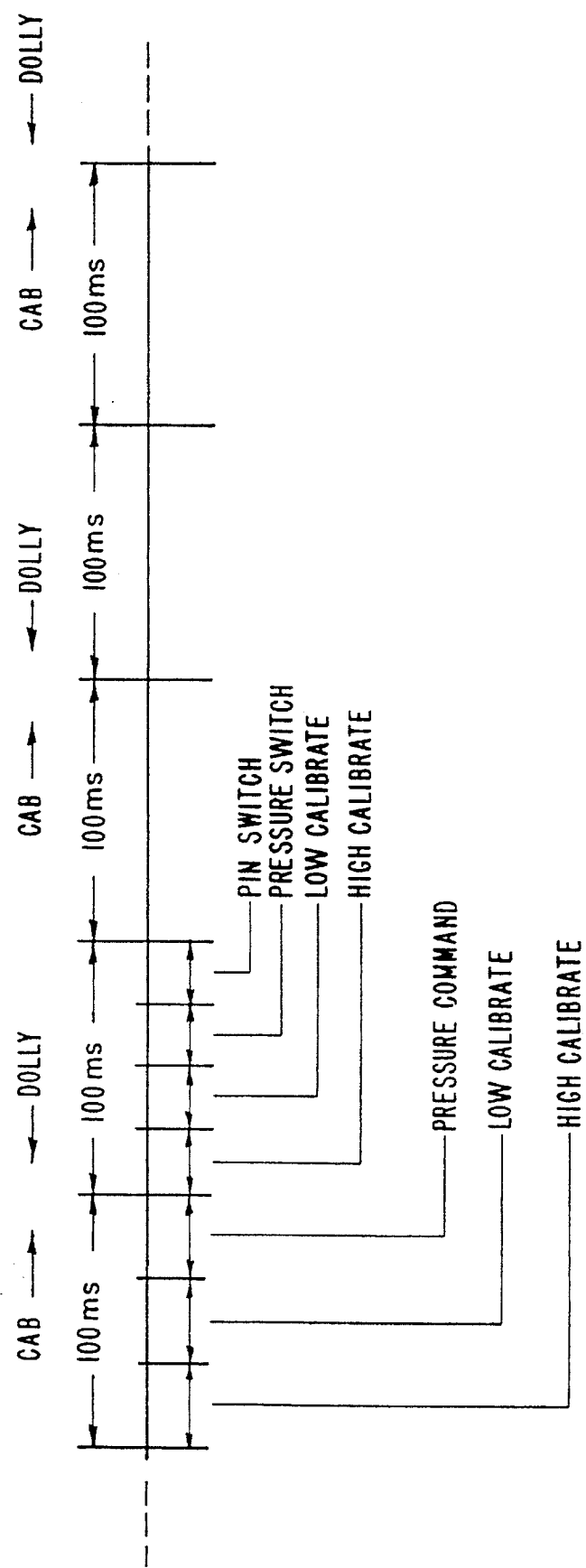

CLUTCH AND CONTROL MECHANISM FOR FIFTH WHEEL

This is a divisional application of Ser. No. 07/908,380, filed Jul. 6, 1992 and now U.S. Pat. No. 5,294,968.

BACKGROUND OF THE INVENTION

For decades the standard coupling between a tractor and a semi-trailer has been a fifth wheel on the tractor, and a fifth wheel plate and king pin on the semi-trailer. The fifth wheel is supported on trunnions for pivotal movement about an axis parallel to the axis of the rear axle or axles of the tractor. The trunnions are rigidly secured to the bed of the tractor. In such an arrangement the semi-trailer king pin is pivotally supported within an opening in the fifth wheel, and relative rotational movement between the tractor and the semi-trailer is about the vertical axis of the king pin at the greased/lubricated bearing surface between the fifth wheel and the fifth wheel plate.

This same coupling arrangement has been and continues to be used as the coupling mechanism between semi-trailers and converter dollies. The converter dolly is, basically, a drawbar frame mounted on a wheeled axle (or axles) which is coupled to the King pin under the front end of a semi-trailer to convert it into a full trailer. Such full trailers are, via a conventional drawbar, coupled to the back of another semi-trailer to form doubles (two trailers connected in tandem) or, in some slates, triples (three trailers connected in tandem).

Since, the early 50's, the Holland Hitch Co., Holland, Mich. has offered a fifth wheel which is mounted on a rotary disc which, in turn, is secured to the tractor frame. This disc rotates about a vertical axis which is, approximately, 4 inches ahead of the vertical axis of the semi-trailer king pin. This rotating fifth wheel, sold under the Trailermaster trademark, also includes a pair of spring biased keys which lock into the slots provided in the fifth wheel plate of the semi-trailer, to prevent relative rotation between the fifth wheel and the fifth wheel plate about the king pin axis.

The Trailermaster hitch is always free to rotate about the vertical rotation axis of the disc on which it is mounted. To control jackknifing between the tractor and the attached semi-trailer, U.S. Pat. No. 2,692,145 to J. H. Hammond, Jr. et al. proposed applying a braking mechanism to a rotatable fifth wheel ("of the type known as the Holland-Apgar Safety Fifth wheel made by the Holland Hitch Co."; see column 2, lines 49–50). The mechanism includes a "brake band 23" which is used to lock the rotatable fifth wheel to "base plate 11".

In addition to J. H. Hammond et al., other rotating fifth wheels with anti-jackknifing controls have been proposed, including: U.S. Pat. No. 2,188,727 to H. A. Soulis; U.S. Pat. No. 2,667,364 to J. Colpo; U.S. Pat. No. 2,804,314 to L. E. Billingsley; U.S. Pat. No. 3,063,739 to P. M. Davies et al.; U.S. Pat. No. 3,328,051 to F. J. C. Hope et al.; U.S. Pat. No. 3,874,699 to P. Hays et al.; and U.S. Pat. No. 4,300,785 to B. J. Mettetal. In Billingsley an enlarged gear 48 is secured to the semi-trailer which mates with a pair of rotatable gears 58, 60 secured to the fifth wheel. Each rotatable gear is connected to a brake mechanism including hydraulic piston and cylinder arrangement 78. Billingsley states that: "it will be seen that by controlling the expansion and contraction of the hydraulic mechanism 78, the rotation of the gear 58 and 60 may be retarded or completely stopped, thereby restraining or stopping relative pivotal movement between the fifth wheel member 24 and the coupling plate 34 whereby relative pivotal movement between the trailer 12 and tractor 14 is eliminated or controlled, depending upon the force exerted on the control lever 86 or the brake pedal 98." See column 3, line 71 to column 4, line 5. In Davies, et al., the fifth wheel is supported on a rotatable subframe "so constructed and so arranged . . . to permit the trailer to swing about the axis of the trailer king pin or about a second vertical axis displaced forwardly thereof. See column 2, lines 31–39.

In addition to rotating fifth wheels with brake mechanisms between the tractor and the semitrailer, rotating fifth wheels with brake mechanisms on converter dollies have been disclosed in U.S. Pat. Nos. 3,556,560 and 4,898,399, both to C. R. Adams. A similar arrangement in which a steering brake is incorporated in a four wheeled or full trailer is disclosed in U.S. Pat. No. 2,838,323 to R. H. Coustillac. It is intended to prevent jackknifing of the trailer in a backing situation.

Despite all of the foregoing disclosures, to applicant's knowledge there is no commercially available tractor, full trailer or converter dolly which incorporates a rotating fifth wheel with an associated braking mechanism to control or prevent the rotation thereof. While the Trailermaster hitch has been available for, apparently, over 30 years it has not, to applicant's knowledge, seen much commercial utilization. Also, it is not supplied with any braking mechanism. While C. R. Adams and/or Aramar Inc. (the assignee of the U.S. Pat. No. 4,898,399 patent) built a prototype, there is no known commercialization of any of the features disclosed therein. Converter doilies have remained essentially enchanted for over 30 years.

The object of the present invention is to provide for converter dollies, permanently attached dollies and rotatable tractor fifth wheels which incorporate sate and reliable fifth wheel braking units that are electronically controlled; include, to the extent possible, off the shelf components (which here-to-fore have not been used in combination with each other); have a minimum number of moving parts; are easy to manufacture, use, and repair; and are designed to handle the loads and stresses which are typically encountered in the trucking industry.

It is a further object of the invention to provide a converter dolly in which, in relation to the front of the dolly, the axis of rotation of the fifth wheel comes first, followed by the axis of the semi-trailer king pin, followed by the axis of the axle. This arrangement has the advantage of forcing the trailer to follow the dolly in a straight line before full lock up of the fifth wheel on the dolly.

It is another object of the present invention to provide, in a converter dolly (or permanently attached trailer dolly, or rotatable tractor fifth wheels with a braking mechanism) a clutch/brake mechanism which has only one moving part, in which the force applied to the friction drum is applied uniformly around the entire circumference of the friction drum, and in which the force of engagement is selectively and easily controlled.

It is another object of the present invention to provide for electronic and pneumatic apparatus for selecting the force applied to the friction drum, to provide for various levels of force, for use in various driving conditions, both forward and reverse.

It is a further object of the present invention to provide an electronic control mechanism which relays the tractor driver's instruction to the rotatable fifth wheel clutch/brake mechanism, which measures the response of the clutch/ brake mechanism and provides verification information back to the driver. Preferably the instructions and response are implemented through a single control wire.

It is a further object of the invention to, via a single wire (specifically the typically unused seventh wire in the standard 7-wire cable used in the trucking industry), send and receive signals between electronically controlled devices (such as the clutch/brake mechanism of the present invention) mounted on a dolly (or trailer or semi-trailer) and a microprocessor located in the tractor.

SUMMARY OF THE INVENTION

A rotatable fifth wheel mechanism for use on converter dollies, truck tractors, and permanently attached dollies. The mechanism includes: a fifth wheel supported on a frame for rotation (relative to the frame) about a vertical axis; and a clutch secured between the fifth wheel and the frame, to control rotation of the fifth wheel relative to the frame. The clutch includes a drum secured to the fifth wheel, friction means completely surrounding the drum and an inflatable bladder for applying pressure to the friction means. The fifth wheel mechanism also includes apparatus for selectively increasing or decreasing the pressure in the bladder to selectively vary the engagement force between the drum and friction means. The apparatus for selectively increasing or decreasing pressure includes at least a pair of electrically operated air valves. The force of engagement between the drum and the friction means varies from an amount sufficient to fully lock the fifth wheel against any rotation, to at least one intermediate setting, to zero force.

The fifth wheel includes at least one spring biased key which, when the fifth wheel is in proper alignment with the fifth wheel plate on a semi-trailer, engages with a mating slot in the fifth wheel plate. The fifth wheel also includes a mechanism for automatically sensing when the key is engaged in the mating slot.

The invention also includes an electric control package which, preferably, is used to control the electronically operated air valves. The electronic control package includes apparatus for initiating a command, apparatus for encoding the command, apparatus for decoding the command and apparatus for implementing the command. The apparatus for encoding and the apparatus for decoding are interconnected by only a single wire (not counting the ground). The wire is, preferably, the seventh (user defined) wire on the standard 7 wire truck cable. The electronics also includes apparatus for verifying all commands sent. The encoding, transmitting and decoding is based on electrical telemetry. A pair of microprocessors are utilized.

BRIEF DESCRIPTION OF THE DRAWINGS

FIG. 2 is a second, partially sectional elevation of the embodiment of FIG. 1, taken at 90° with respect to the section of FIG. 1;

FIG. 5, is a partial vertical section, similar to FIG. 1, but showing the mechanical features of the present invention adopted as a steering control for a four wheeled (i.e., full) trailer;

FIG. 12 is a schematic of the overall signaling sequence between the cab electronics and electronics associated with the device to be controlled.

DESCRIPTION OF THE PREFERRED EMBODIMENTS

Figure 1:
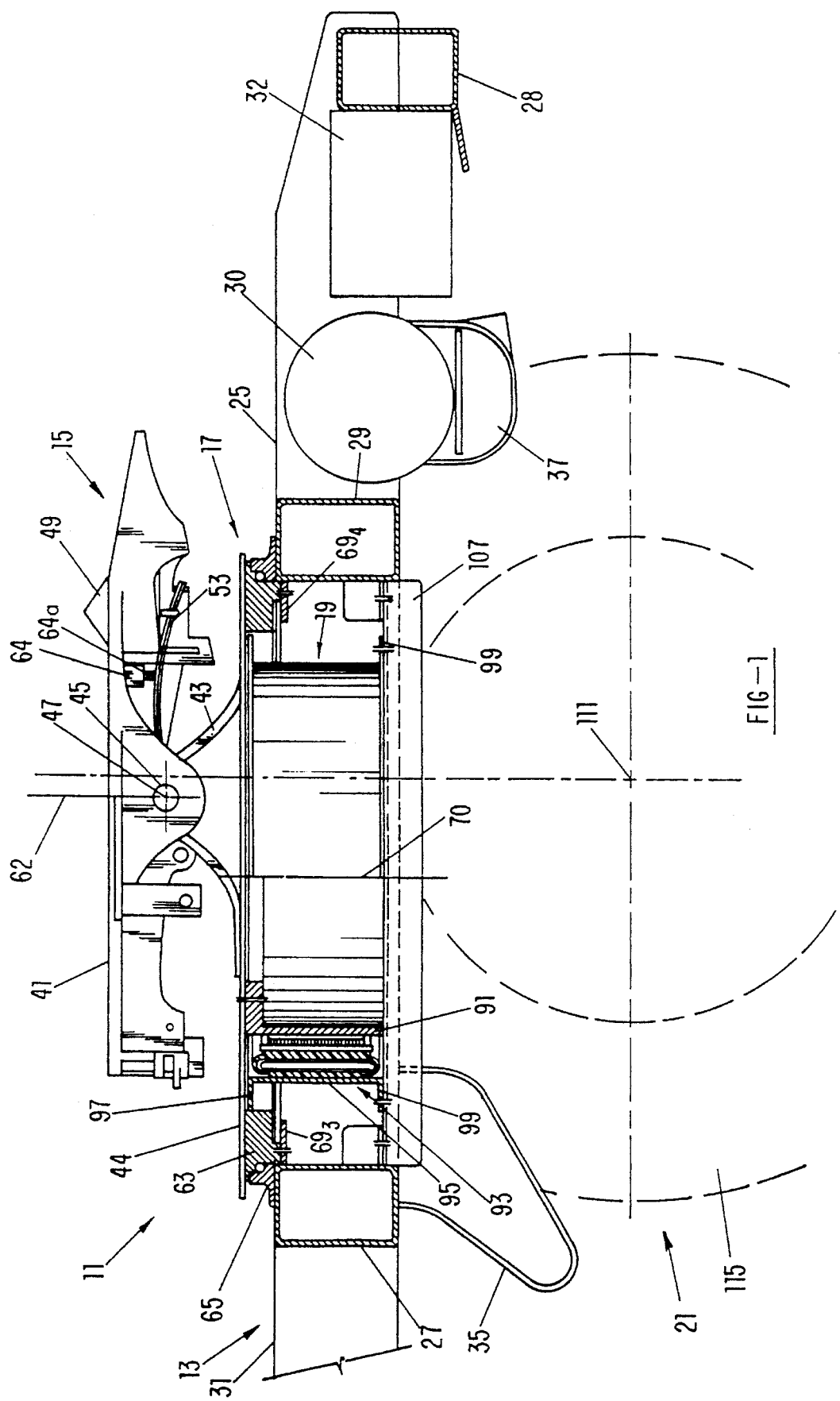
FIG. 1 is a partially sectional elevation of the first embodiment of the mechanical features of the rotatable fifth wheel mechanism of the present invention, when incorporated into a converter dolly.

With reference to FIG. 1, converter dolly 11 includes a dolly frame 13, a fifth wheel 15, a rotatable fifth wheel support 17, a rotation control mechanism 19 and an axle/suspension system 21.

Frame 13 includes a pair of longitudinal frame members 23, 25, formed of 3/16 inch thick rectangular tubing, interconnected by three cross members, also of 3/16 inch thick rectangular tubing, such as indicated by 27, 28 and 29. The forward end 31 of dolly 11 is, in top plain view, triangular in shape and includes two additional 3/16 inch thick rectangular tubes, which are welded together at the front end and which supports a conventional draw bar eye (not shown). The rear of dolly 13 also includes an air tank 30 for rotation control mechanism 19 and an enclosed compartment 32 in which the fifth wheel pneumatic controls are housed. Finally, dolly 13 includes front spring hangers at 33 and 35 and rear spring hangers such as illustrated at 37. The rectangular tubes are welded together, along with suitable gussets and other metal stiffening members (not shown).

Figure 1A:
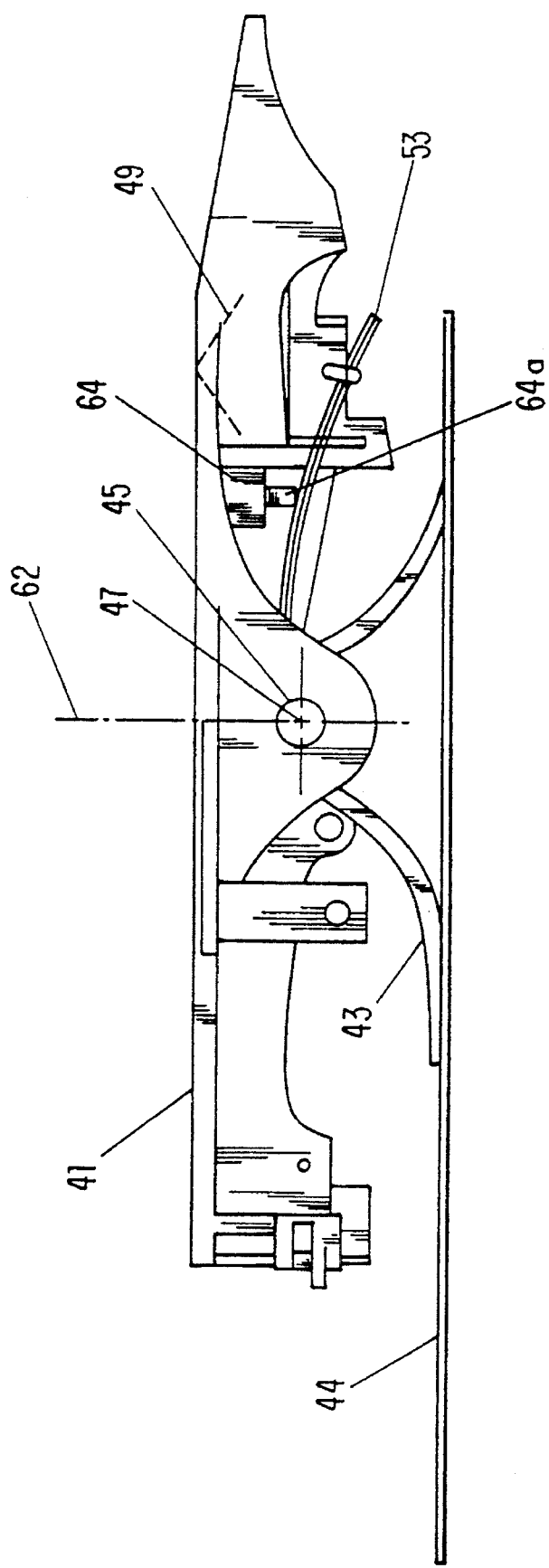
FIG. 1A is a view of the fifth wheel of FIG. 1, with the key sensor switch shown in the open position.

As fifth wheel 15 is a Holland Trailermaster, it is not described in great detail. With reference to FIG. 1, it includes a top pivot plate 41 which is supported by a pair of trunnions and pivot pins, such as illustrated at 43 and 45, for pivoting about axis 47. Trunnions 43 are welded to plate 44 which is, typically, ½ inch thick. Fifth wheel 15 also includes a pair of movable keys or locking tabs 49, 51 which are biased in the position illustrated in FIGS. 1, 2 and 3 by leaf springs, such as illustrated at 53. Keys 49, 51 lock fifth wheel 15 to a semi-trailer fifth wheel plate 55 (FIG. 3) including a pair of key receiving slots 57 and 59 and a conventional king pin 61, having a vertical axis 62. Fifth wheel 15 is modified by the inclusion of position sensor switch 64, which is mounted on the underside of pivot plate 41 with plunger 64a in engagement with leaf spring 53. FIG. 1 illustrates the switch closed condition; FIG. 1A, the switch open position. Switch 64 is connected, via conventional wiring (not shown), to the electronic controls housed in compartment 32, to signal to the truck driver whether or not keys 49 and 51 are properly seated in slots 57 and 59.

Figure 3:
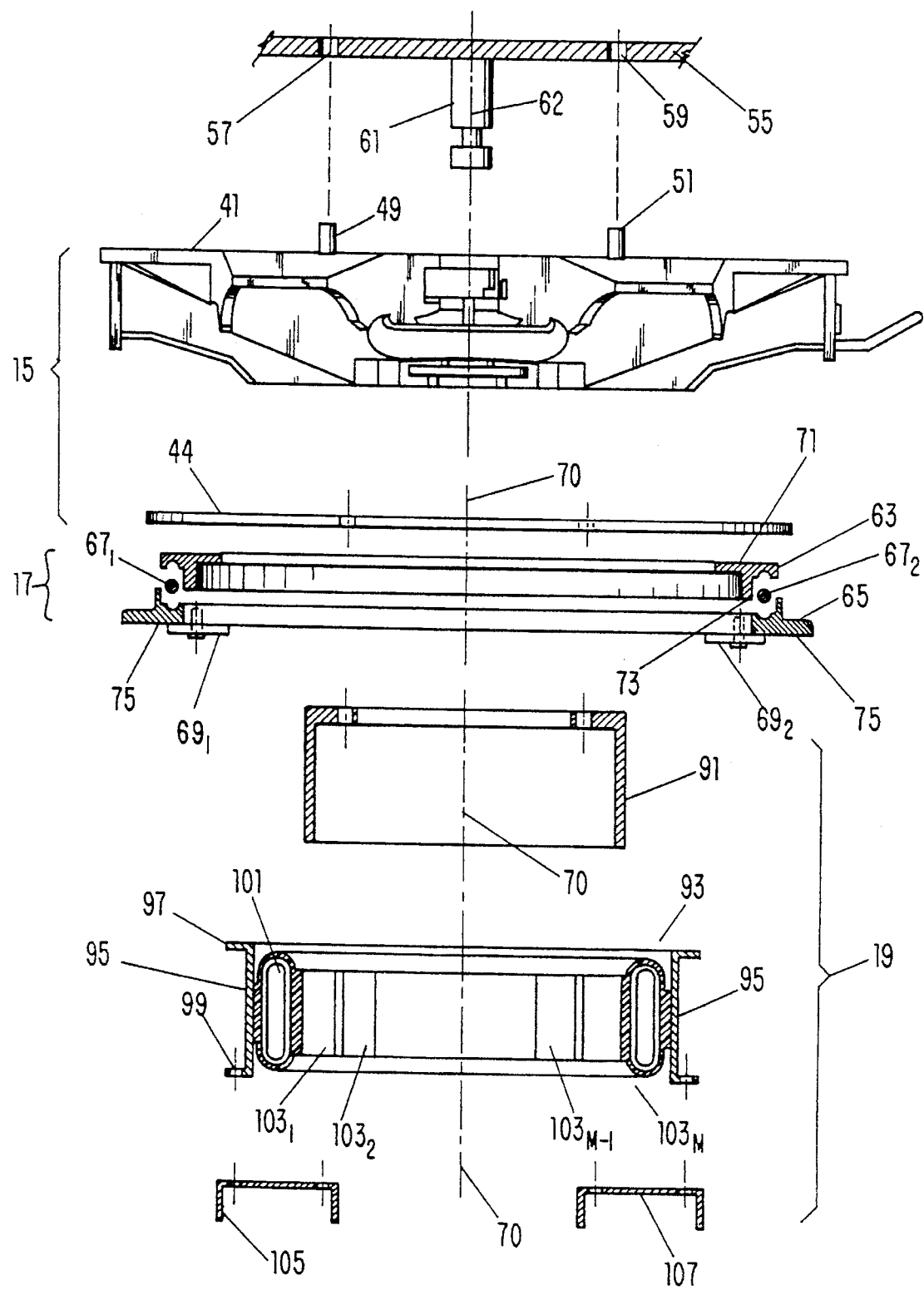
FIG. 3 is an exploded view of the embodiment of FIGS. 1 and 2.

As best illustrated in FIG. 3, rotatable support, or turntable 17 includes an upper bearing race 63, a lower bearing race 65, a plurality of ball bearings such as indicated by $67_1$, $67_2$ and a plurality of bearing retainer plates $69_1$, $69_2$, $69_3$ and $69_4$. Race 63 rotates relative to race 65 about axis 70. Plate 44 is, preferably, bolted to the top surface 71 of upper bearing race 63 to form a very rigid unit, as illustrated in FIGS. 1 and 2. Lower bearing race 65 is secured to rectangular tubing 23, 25, 27 and 29 by bolting. Retainer plates $69_1$, etc. are secured to lower surface 73 of upper bearing race 63 and overlap the inner edge of plate 75, as best illustrated in FIG. 2.

Figure 4:
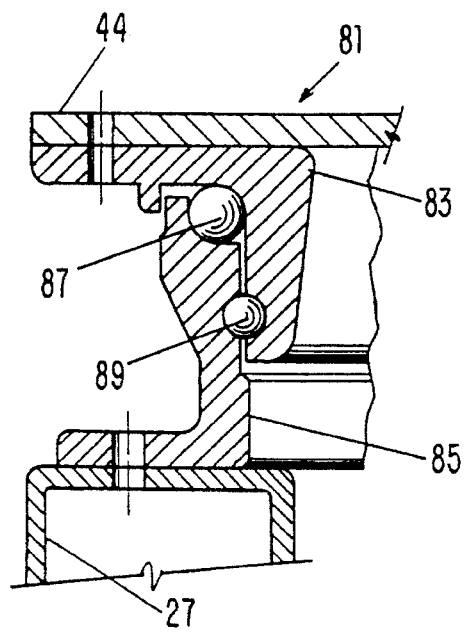
FIG. 4 is a partial sectional view of the preferred double race bearing incorporated into the rotatable fifth wheel mechanism of the present invention.

With reference to FIG. 4, an alternate, stronger and preferred rotatable support or bearing system 81 is illustrated. Bearing 81 includes an upper bearing race 83 and a lower bearing race 85, which are connected together by a pair of ball races in which are received load carrying balls such as indicated by 87 and guide balls such as indicated at 89. Such a turntable is available from Bergische Achsenfabrik (Germany) under the BPW mark. Lower bearing race 85 is designed to be bolted to rectangular tubing 23, 25, 27 and 29. Upper bearing race 83 is designed to be bolted to plate 44.

Again with reference to FIGS. 1–3, rotation control mechanism 19 includes friction drum 91 and clutch 93, which is an Airflex® 22CB500 (manufactured by Eaton Corporation, Airflex Division, Cleveland, Ohio) or equivalent. Clutch 93 includes an outer support ring 95 having lips 97 and 99, inflatable bladder 101 and a plurality of friction pads $103_1$, $103_2$, $103_n$, all illustrated in FIG. 3. Lip 97 is optional and may be eliminated to facilitate assembly. As best illustrated in FIGS. 1 and 2, lip 99 is secured to C-channels 105 and 107 which are secured to frame members 27 and 29 of dolly 13, by welding and bolting. Drum 91 is secured, also by bolts, to plate 44 for rotation therewith about turntable axis 70.

Eaton type clutches, which are air operated, have been around for over 50 years. However, to applicant's knowledge, such clutches have not been used or suggested in the trucking industry. This is because Eaton type clutches are designed for operations where there is 360° rotation between, typically, a rotating friction drum and the pads of such clutches. As there is only limited rotational movement between drum 91 and clutch 93, it has been necessary to provide a softer friction pad material, such as cork, than is typically used with such clutches. In operation, friction pads $103_1$, $103_2$, ... $103_n$, contact friction drum 91 through a full 360°. Expansion of bladder or tube 101 distributes the pressure evenly around the full circumference and across the entire width of drum 91. The use of cork-type material gives 100% braking immediately, with no brake in period. The Airflex® clutch torque capacity is directly proportional to the air pressure applied, up to the maximum system pressure.

Axle/suspension system 21 includes an axle (not shown), which has an axis of rotation 111 that, in turn, supports four wheels and tires, such as partially illustrated in phantom lines at 113 and 115. The axle is secured to dolly frame 13, via a pair of conventional leaf spring assemblies (also not shown).

As is evident from FIG. 1, proceeding from the front of dolly 13, turntable axis 70 is first, followed by trunnion axis 47 and finally axle axis 111. The axis 62 of king pin 61 intersects trunnion axis 47. By locating the vertical plane which includes axes 47 and 62 forward of the vertical plane which includes axis 111, the stability of dolly 11 is enhanced. Further, locating axis 70 ahead of the other two axes, permits dolly 11 to track straight (behind the trailer to which it is coupled) before bladder 101 is inflated to lock drum 91 in position.

With reference to FIG. 5, dolly 121 is attached permanently to the front end of a full trailer, thereby eliminating the necessity of a fifth wheel and landing gear. This provides both a weight reduction and cost advantage to the trailer user. Dolly 121 includes frame 123, rotatable support 125, rotation control system 127 and axle/suspension system 129.

Frame 123, similar to frame 13, includes a pair of longitudinal frame members, one of which is illustrated at 131, formed of 3/16 inch thick rectangular tubing. The longitudinal members, are connected by three cross members 133, 134 and 135, also made of 3/16 inch thick rectangular tubing. Welded to the front end of the longitudinal frame members are a pair of rubber bushed hinge assemblies, one of which is illustrated at 137 to which is rotatably supported conventional drop nose 139. Finally, dolly 121 includes a pair front spring hangers and rear spring hangers such as illustrated at 141 and 143.

Secured to the bed 145 of the trailer is a fabricated ring frame, which includes top horizontal ring-shaped section 147, vertical section 149 and bottom plate 157 all welded together. Plate 157 is bolted, or otherwise permanently secured to rotatable support 125 which, in top plan view (not shown), is generally circular in shape. As with the embodiment of FIG. 4, rotatable support 125 includes an upper bearing race 159 to which plate 157 is secured via bolts (not shown), and lower bearing race 161 which is bolted to the frame 123. Upper race 159 rotates about vertical axis 163. Rotation control mechanism 127 includes friction drum 165, which is bolted or otherwise permanently secured to plate 157 and an Airflex clutch 167, such as used with the embodiment of FIGS. 1–3. The support ring 168 of clutch 167 is secured to frame 123 via a pair of C-channels, one of which is illustrated at 169.

Axle/suspension system 129 includes axle 171, which has an axis of rotation 173, and which supports four wheels and tires, one of which is illustrated in phantom lines at 175. Axle 171 is secured to frame 123 with a pair of conventional leaf spring assemblies, such as illustrated at 177, or a conventional air suspension system. As is evident from FIG. 5, the vertical plane which includes axis 163 is forward the vertical plane which includes axis 173. This arrangement insures that dolly 121 will track straight (behind the trailer to which it is coupled) before the bladder of clutch 167 is inflated to lock drum 165 in position.

Figure 6:
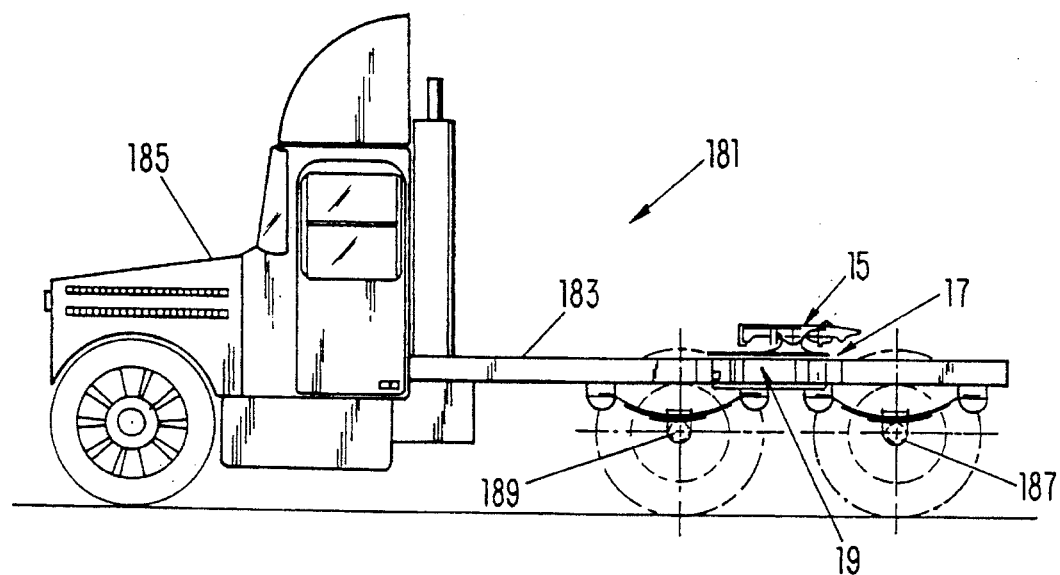
FIG. 6, is a partial vertical sectional view, similar to FIG. 5, showing the mechanical features of the rotatable fifth wheel adapted to a tractor/truck frame.

As is apparent from FIG. 6, the rotatable fifth wheel with rotation control of FIGS. 1–4 can be attached directly to a tractor. Alternately, this mechanism can be applied to a dolly with a pair of tandem axles, so that more weight can be hauled. Tractor 181 includes a conventional frame 183, a cab 185, a pair of tandem axles 187 and 189 and the fifth wheel mechanism of the first embodiment. The rotation control mechanism can also be attached to a single axle tractor.

Figure 7:
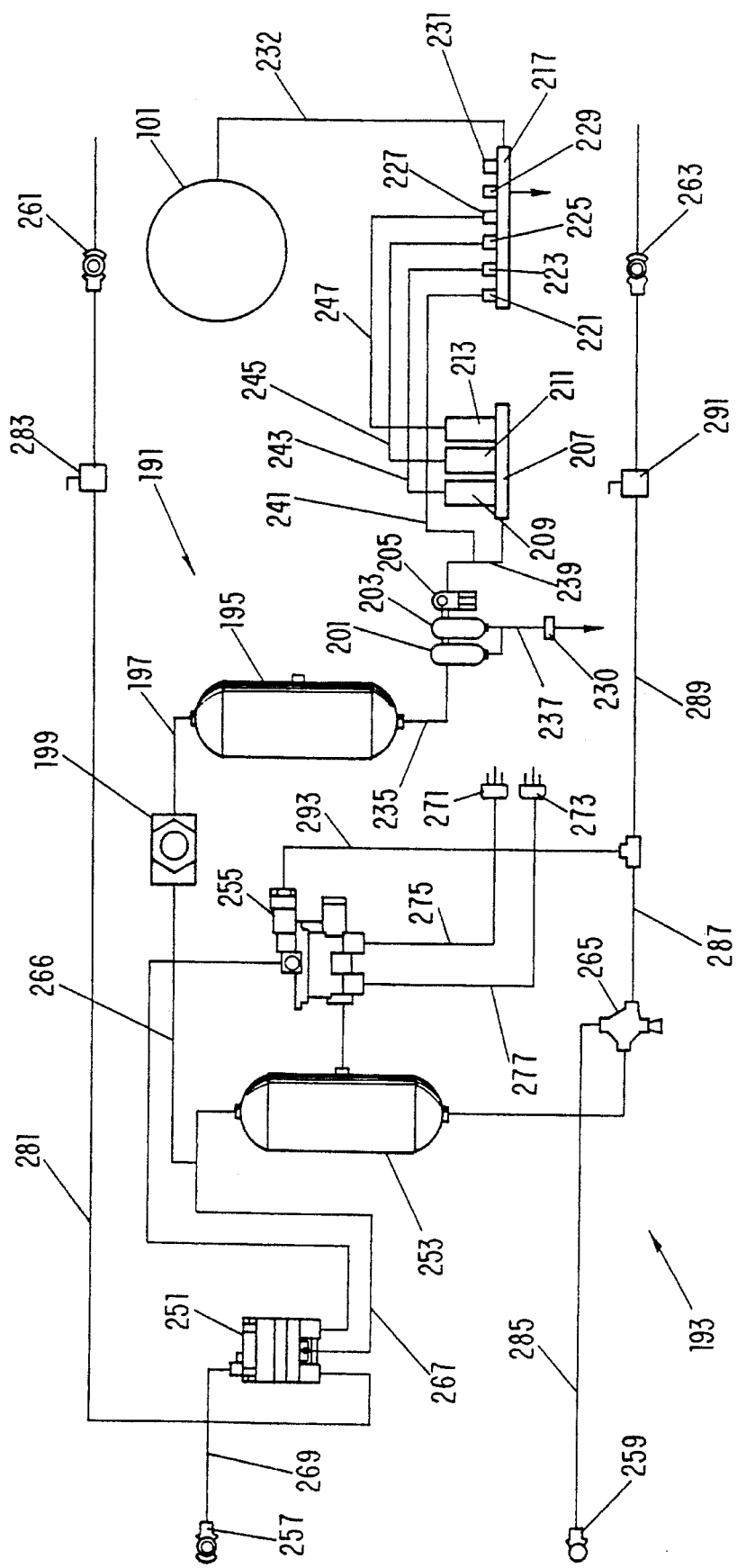
FIG. 7 is a schematic of the pneumatic controls of the present invention as applied to a converter dolly of the present invention.

With reference to FIG. 7, the pneumatic control system 191 for rotation control system 19 is disclosed. Also disclosed is the pneumatic control system 193 for the brakes of dolly 11. However, as those skilled in the art will appreciate, these latter controls will vary depending on whether the rotation control system of the present invention is used on a converter dolly, a full trailer or a tractor.

Control system 191 includes a dedicated air tank 195 which is connected to the dolly pneumatic system 193, via line 197 and check valve 199. System 191 also includes: a pair of air filters 201, 203; a primary regulator 205; a manifold 207; a plurality of pressure regulators 209, 211 and 213; a second manifold 217; a plurality of electrically operated air valves 221, 223, 225, 227, and 229 supported by manifold 217; an electronically operated air valve 230; and pressure transducer 231 for measuring the pressure in the manifold 217, bladder 101 and the interconnecting line 232, and sending a signal to the dolly electronics indicating if the regulated pressure is met. Filters 201 and 203 are connected: in series with each other and with primary regulator 205; to tank 195 via air line 235; and to valve 230 via air line 237. Regulator 205 is connected to manifold 207 (via line 239) and to air valve 221 (via line 241). Pressure regulators 209, 211 and 213 are connected in series with, respectively, valves 223, 225 and 227, and in parallel with each other via air lines 243, 245 and 247. The above identified components of control system are typically housed in compartment 32 supported adjacent the rear of dolly frame 13.

Briefly, the dolly brake system 193 includes: a first control line valve 251; air pressure tank 253; a relay emergency valve 255; a pair of glad hands 257 and 259 to connect the system to, respectively, the control and supply air lines of the tractor; a pair of couplings 261 and 263 to connect the system to the control and supply lines of the trailer; and a control value 265. Check valve 199 is connected to control valve 251, via lines 266 and 267. Valve 251 is, in turn, connected to the control pressure system of the tractor via line 269 and glad hand 257. The dolly brakes 271 and 273 are connected in the conventional manner to relay emergency valve 255 by air lines 275 and 277. The system also includes: line 281 and cut-off valve 283; line 286 interconnecting glad hand 259 with control valve 265; lines 287, 289 and cut-off valve 291; and line 293.

In operation, air tank 195 is pressurized to the maximum desired system pressure. Valve 199 holds the desired pressure in tank 195 (120 psi ±10) and insures there is no bleed back. Because of the interconnections with tank 195 and the setting of primary regulator 205, a maximum system pressure of 120 psi ±10 psi is maintained in line 241, in manifold 207 and, hence, on the input side of pressure regulators 209, 211 and 213. The maximum pressure which bleeds moisture from filters 201 and 203 is also available in bleed off line 237 and at valve 230 which controls this line. Pressure regulators 209, 211 and 213 are set at, respectively; a second pressure, less than the maximum system pressure; a third pressure, less than the setting in valve 209; and a fourth pressure, less than the setting on valve 211.

With the arrangement set forth above, the tractor driver has a choice of applying, via electronic section of one of valves 221, 223, 225 or 227, one of four preselected pressures to bladder 101. Alternatively, by activating valve 229, which releases the pressure in manifold 217 and line 232, no air pressure is applied to bladder 101 and fifth wheel 15 and fifth wheel support 17 rotate freely about axis 70. With the use of clutch 93, the torque which friction pads $103_1 \ldots 103_n$ exert on friction drum 91 is directly proportional to the air pressure applied, up to the maximum air pressure rating of clutch 93. With the maximum pressure applied, drum 91 is locked and fifth wheel 15 and, hence, the semi-trailer attached thereto, is prevented from rotating about axis 70. However, as those skilled in the art will appreciate, the semi-trailer attached to dolly 11 will still pivot about the vertical axis defined by the dolly draw-bar eye (not shown) and the mating coupling (also not shown) on the trailer/ semi-trailer to which dolly 11 is attached. This is the fully locked position that would normally be used in highway driving. At the opposite extreme (i.e., with no restraining torque applied to drum 91) fifth wheel 15 and fifth wheel support 17, and the attached semi-trailer are free to rotate about axis 70. This is the position that would normally be used, as for instance, after hitching the semi-trailer to dolly 11, to insure that axes 70 and 62 were in the proper alignment before applying the desired torque to drum 91. The second pressure set by regulator 209 and activated by valve 223 would put a second torque on drum 91, less than when bladder 101 is inflated with the maximum pressure, which will restrain rotation of the attached semi-trailer up to a pre-determined value and thereafter allow rotation with resistance. This would be used in turning to prevent the dolly tires from slipping during ice and snow conditions. With valve 225 activated, the third pressure set by regulator 211 is applied to bladder 101. This setting would normally be used in backing up a loaded semi-trailer to a dock for unloading. The fourth setting, via regulator 213 and electrically controlled valve 227, would be used in backing up an empty semi-trailer where some, but not a lot of resistance to turning about axis 70 is desired.

While semi-trailer weight is the most important factor, the particular settings selected for regulators 209, 211 and 213 may vary, depending upon such factors as the load being carried by the attached semi-trailer, the position of the load on the semi-trailer, the driving conditions (e.g., dry, wet or icy roads), and the design specifications of the clutch selected. As an example on an oil tanker trailer when the front chamber of the rear trailer is unloaded first, the dolly will articulate more radically when driving, causing extreme tire ware. This situation also occurs in vans when the load or weight is positioned to the rear.

Figure 8:
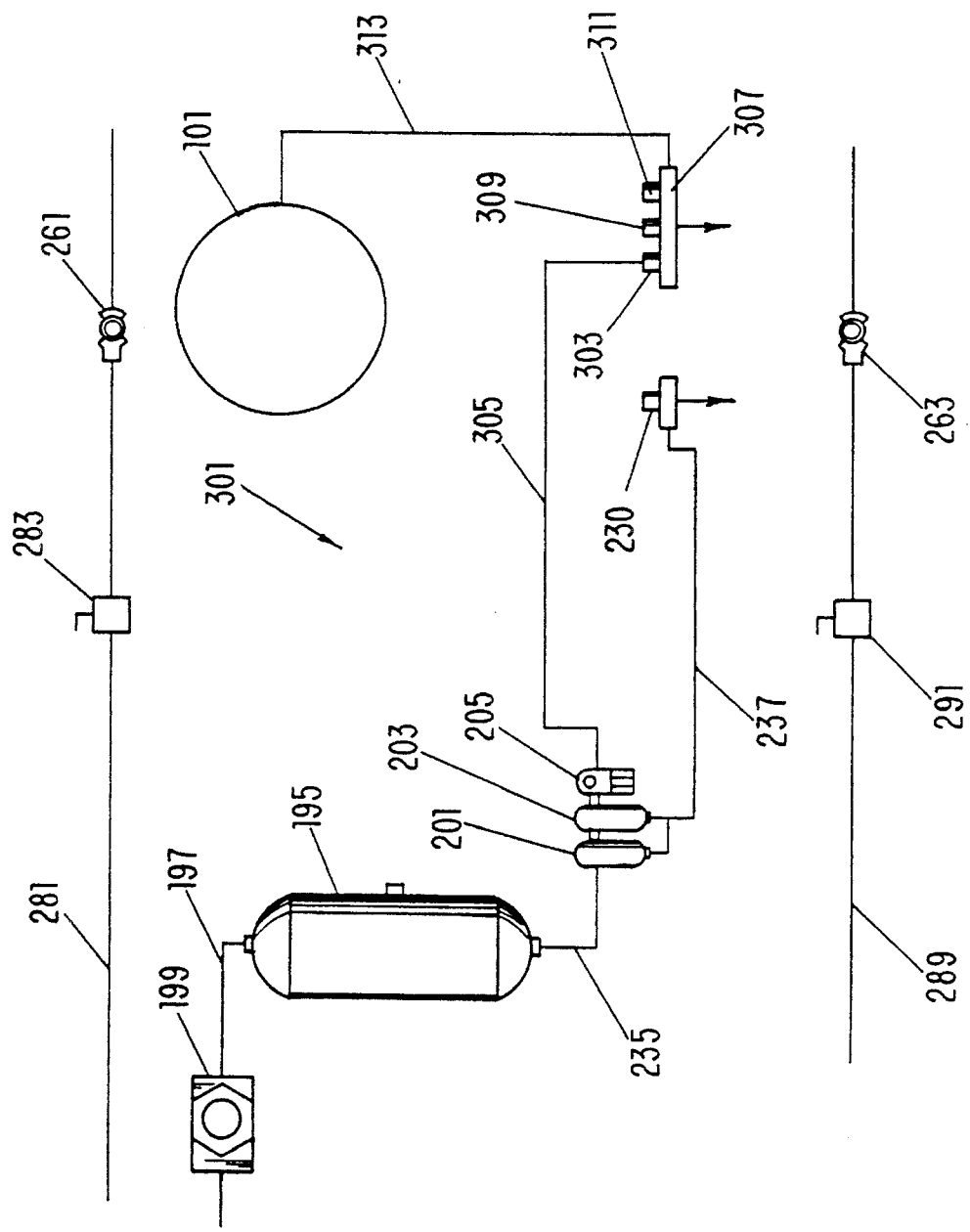
FIG. 8 is a schematic of an alternate set of pneumatic controls for the converter dolly of the present invention.

With reference to FIG. 8, alternate pneumatic control system 301 for rotation control system 19 is disclosed. System 301, like pneumatic control 191, includes dedicated air tank 195, check valve 199, air filters 201 and 203, primary regulator 205, and air value 230 (for exhausting moisture out of filters 201 and 203 and air line 237). However, instead of series of pressure regulators connected with a series of valves, regulator 205 is connected to electronically operated input air value 303 via to air line 305. Air valve 303 is in turn, supported by manifold 307, which also supports exhaust air valve 309 and pressure transducer 311 which functions in the same way as pressure transducer 231 (FIG. 7). Manifold 307 is connected to bladder 101 via air line 313.

In operation, air tank 195 is pressurized to 120 psi (±10 psi). Again, because of the interconnections with tank 195, and the setting of regulator 205, the maximum system pressure (i.e., 120±10 psi) is maintained in line 305 and the input side of air valve 303. The pressure in manifold 307, line 313 and, hence, bladder 101 is regulated by input air valve 303 and exhaust air valve 309. To increase the pressure, up to 120 psi (± 10), valve 303 is opened. To decrease pressure in manifold 307 to the desired setting, exhaust valve 309 is opened, until pressure transducer 311 senses that the desired pressure (set by the driver of the truck by activating the switch) is reached. As with the previous embodiment, different pressure setting on bladder 101 are used depending on the load, the road conditions, and the driving activity being undertaken.

In addition to single axle convertor dollies, the pneumatic systems described above could be used with tandem axle converter dollies and fixed dollies, such as illustrated in FIG. 5. In all such uses the trailer would always be able to rotate around the vertical axis defined the draw-bar eye and the mating coupling on the trailer to which it is attached. Where fifth wheel 15, fifth wheel support 17 and rotation control mechanism 19 are secured to the frame of a tractor, as in FIG. 6, the pneumatic controls for mechanism 19 could be used in emergency situations (ice, snow and rain) when the driver wants to prevent jackknifing; and help in backing up with various loads and with larger trailers. It should also prevent trailer sway in wind storms.

Figure 9:
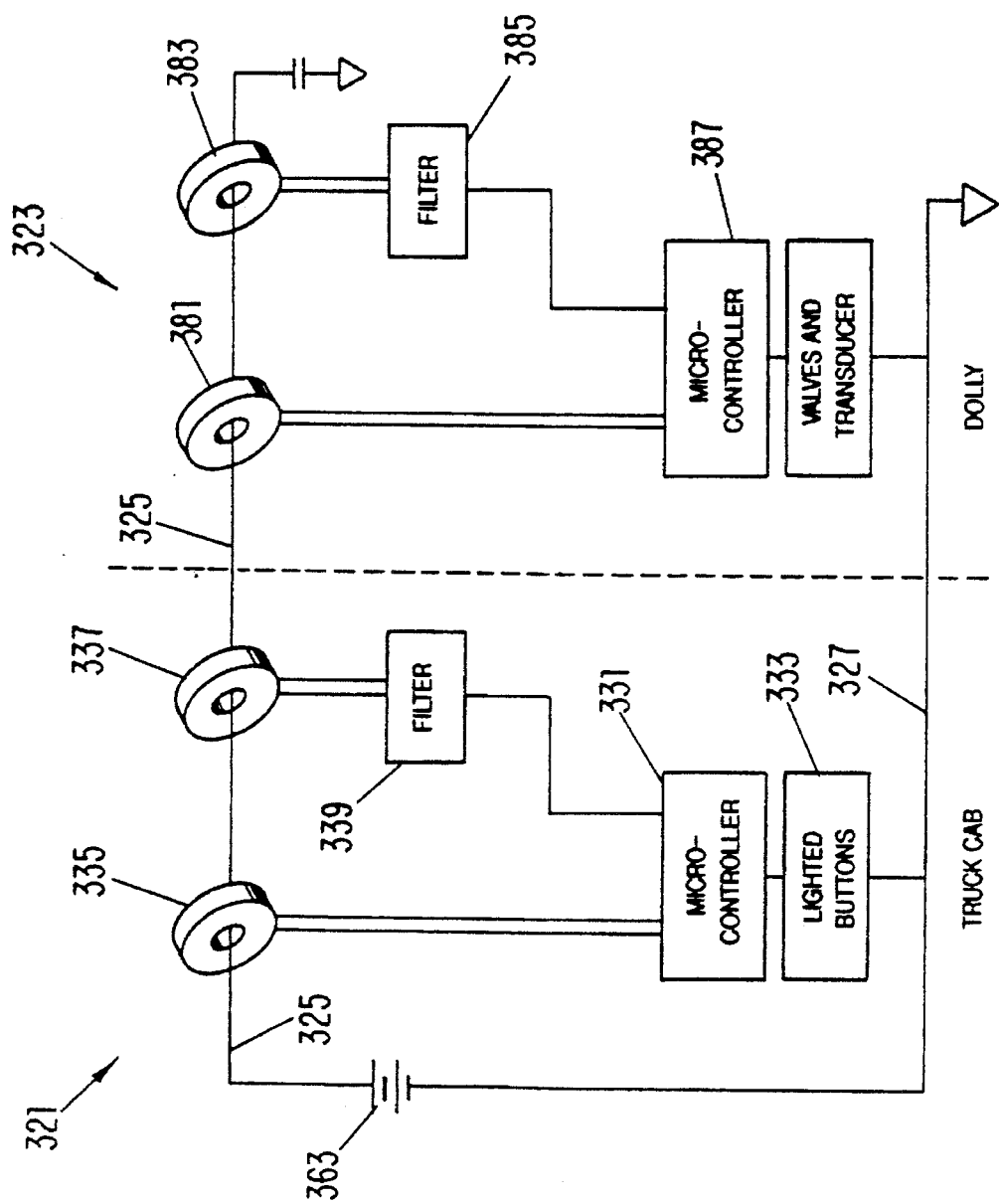
FIG. 9 is a block diagram of the electronics of the present invention.
Figure 10:
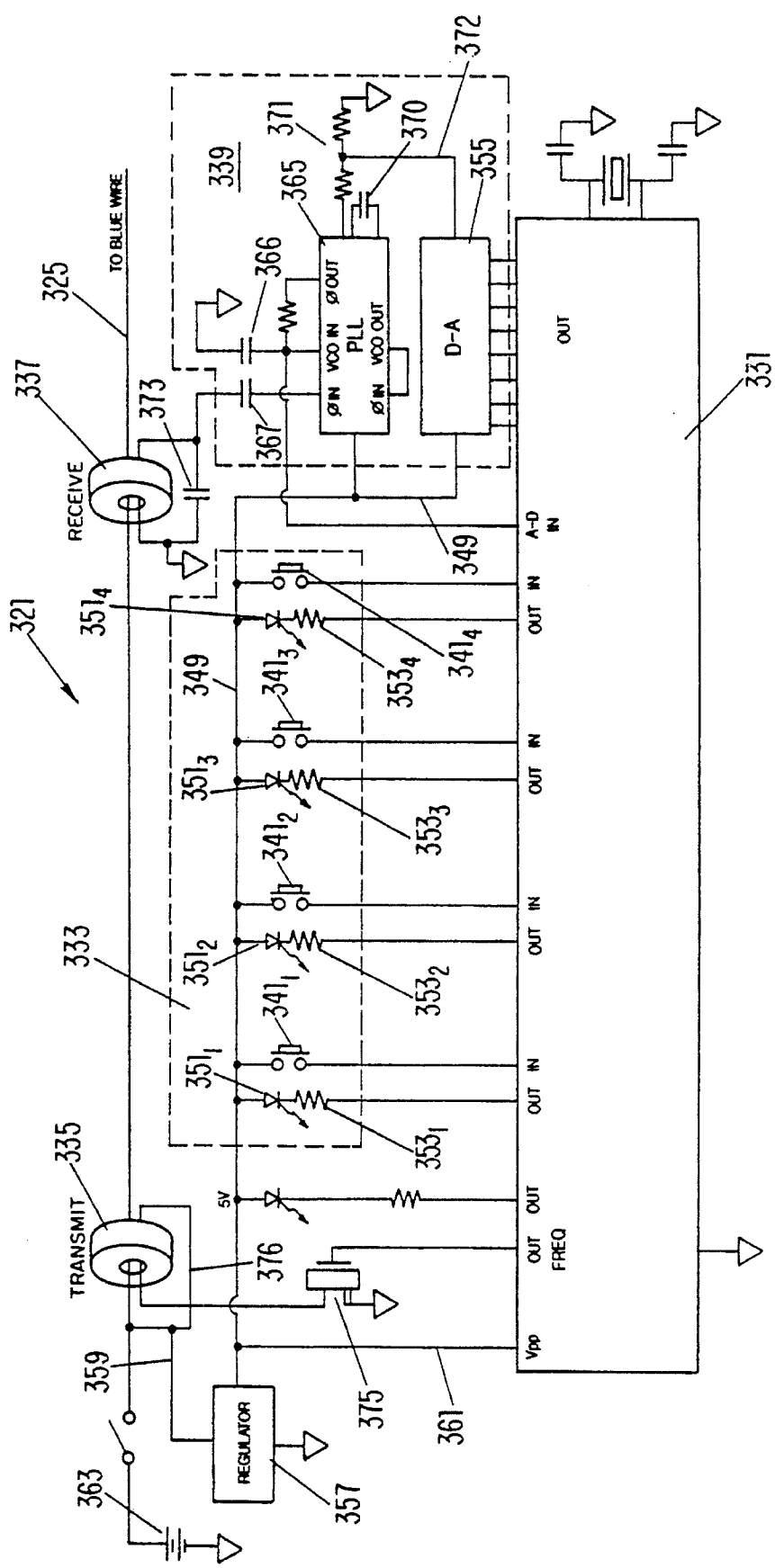
FIG. 10 is a detailed electrical schematic of the cab portion of the fifth wheel brake controller.
Figure 11:
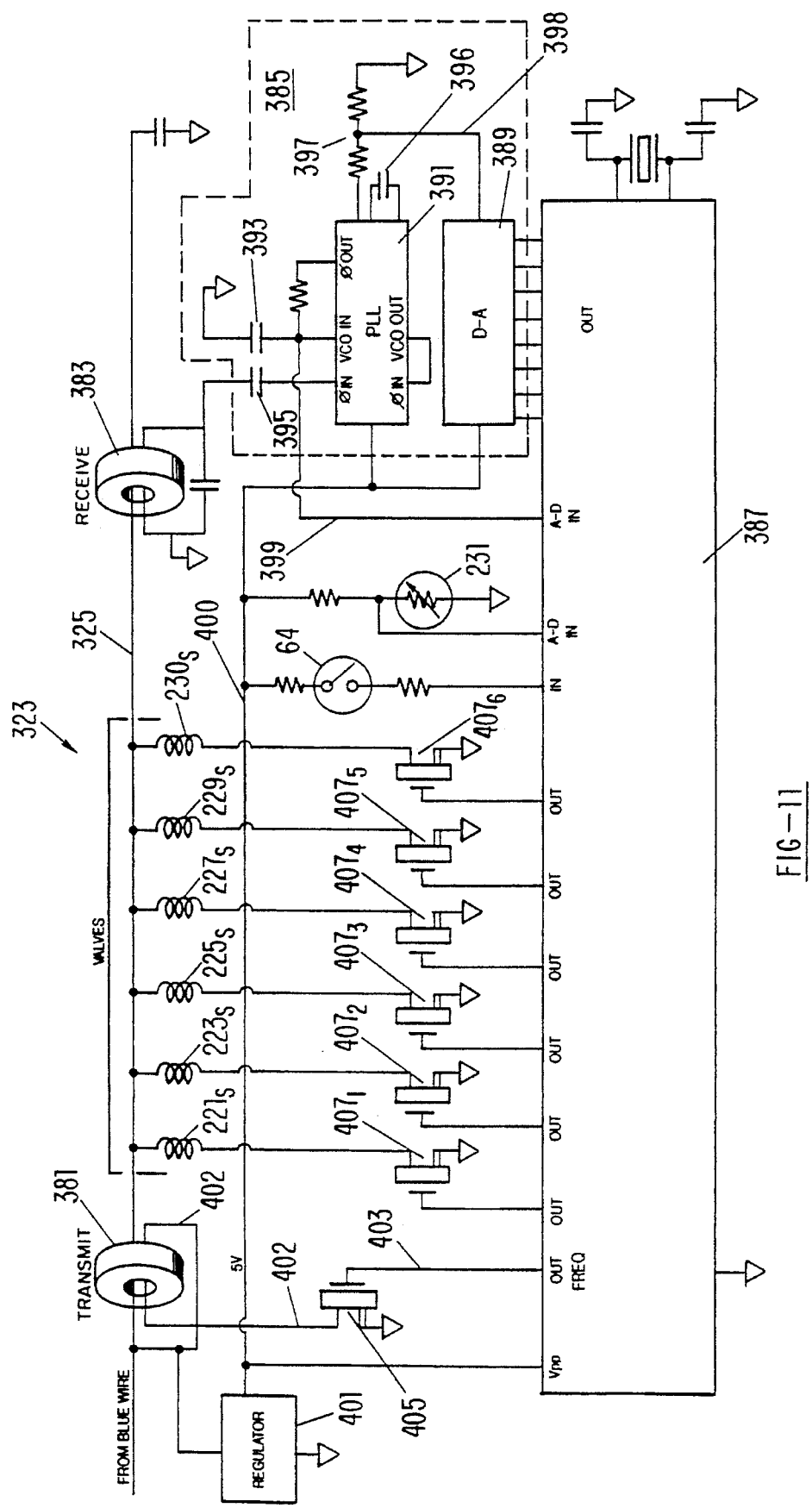
FIG. 11 is a detailed electrical schematic of the dolly portion of the fifth wheel brake controller.

The electronically controlled dolly fifth wheel brake control system, for the pneumatics of FIG. 7, is illustrated in FIGS. 9, 10 and 11. Various settings of the controls are manually initiated by the driver from a control panel located in the cab of the truck. The driver is able to select fifth wheel brake pressures ranging from no pressure to maximum available pressure by means of a series of lighted push buttons. The signaling between cab and dolly as well as the power for the dolly electronics is achieved using only one wire, in addition to the standard ground wire (included in the standard 7-wire cable used in the trucking industry).

The electronic control system must perform the functions of encoding, transmitting, receiving, decoding, implementing, and verifying commands. Several different forms of electronic circuits can be used to perform the necessary functions. However, for the present invention a single wire (in addition to the standard ground) is used for both power and signalling. The variations in the form of the electronics is, then, determined by the method of signalling used. Preferably, the signalling method is an electrical telemetry scheme, the three most common schemes of which are: pulse-code telemetry; frequency coded telemetry; and frequency modulated pulse-code telemetry. None, to applicants' knowledge are or have been used in the trucking industry.

Pulse code telemetry sends signals by raising and lowering the voltage on the signalling line in a predetermined pattern. The pattern is either the presence and absence of voltage change, a simple binary code, or binary code sent via narrow and wide pulses, pulse-width modulation, or other similar techniques. The information to be transferred is sent as a binary number or as a pulse position in a string of pulses. Pulse code can be used to transmit pushbutton commands to the dolly and encode the measured response for transmission back to the cab unit.

Frequency coded telemetry is even simpler in concept. The data to be sent is converted to a particular frequency that represents the particular command being transmitted. The receiving unit determines which frequency was sent and converts that information to the appropriate command(s). Similarly, the measured response (i.e., dolly fifth wheel brake pressure) is converted to a frequency that is sent back to the cab unit to verify that the command was properly executed.

The third technique is to use two frequencies to represent "zero" and "one" of a binary code. A transmission consists of a sequence of signals that switch back and forth between two frequencies to create a sequence of zeroes and ones. The binary code is interpreted as commands or verification with subsequent action as above.

The preferred embodiment for the present invention uses frequency encoding for data telemetry and multiple regulators with separate electronically actuated valves for pressure control. In addition, the encoding and decoding is performed by a microcontroller in the cab unit and a second microcontroller in the dolly unit.

With reference to FIG. 9, the electronic control system is divided into two units: the truck cab electronics unit 321 and dolly electronics unit 323. These two units are linked by a single wire 325 (in addition to ground return wire 327). Preferably wire 325 is the currently user defined seventh (or blue) wire in the standard 7-wire cable used in the trucking industry. Sometimes the blue wire is used to supply power to charge batteries in trailer refrigeration units or trailer dome lights; typically it is unused. The chosen frequency encoding telemetry does not interfere with other, concurrent uses of the blue wire.

Cab electronics 321 includes a microcontroller 331, a switch pad 333, a magnetic transmitter coupler 335, a magnetic receiver coupler 337 and filter 339. Microcontroller 331 is, preferably, an Intel R87C196KB which includes an internal A-D converter. For purposes of clarity, transmitter coupler 335 and receiver coupler 337 are illustrated separately. In actual practice receiver coupler 337 is, preferably, incorporated into transmitter coupler 335 as an extra winding. While magnetic couplers are preferred, capacitive couplers could also be used (with appropriate modification to the associated electronics).

A detailed schematic of cab electronics 321 is shown in FIG. 10. Switch pad 333 includes four push button switches $341_{1-4}$, which are connected between 5 volt power line 349 and separate inputs on microcontroller 331. Connected in parallel with each switch 341, between power line 349 and separate outputs on microcontroller 331, are four light emitting diodes LED's $351_{1-4}$, each connected in series with a current limiting resistor $353_{1-4}$ (which is included to prevent diode burnout). Each diode $351_{1-4}$ is used to light its associated switch 341. Line 349 interconnects D-A converter 355, with regulator 357 which, in turn, is connected to wire 325 by wire 359 and to microcontroller 331 by wire 361. Regulator 357 reduces and stabilizes the voltage of truck battery 363 from 12v. to 5v.

Filter 339 includes the unique combination of a conventional D-A converter 355 and a conventional phase lock loop (PLL) 365, along with smoothing capacitor 366, and coupling capacitor 367. PLL 365 also includes a frequency determining capacitor 370 and a frequency determining resistor 371 which, as illustrated in FIG. 10, is split by the output 372 from D-A converter 355.

Microcontroller 331 is programmed to examine the inputs from switches $341_{1-4}$ to identify which one is actuated. In the event that two switches 341 are simultaneously actuated, the input representing the highest of the two pressures to be applied to bladder 101 is taken as the intended command and microcontroller 331 causes a square wave of voltage to appear at the terminal marked OUT-FREQ. This output square wave drives field effect transistor (FET) 375, which acts as a voltage controlled switch to cause a 12 volt square wave to appear on the windings of transmitter coupler 335. As is evident from FIG. 10, a 12 volt line 376 connects line 325 with FET 375. The frequency of the output signal corresponds to the selected command. The duration of the output signal is only long enough (preferably in the range of 30–50 msec.) to be a reliably recognizable command since other signals have to be transmitted over wire 325 (as explained below).

With reference to FIGS. 9 and 11, dolly electronics 323 includes a magnetic transmitter coupler 381, a magnetic receiver coupler 383, a filter 385, and microcontroller 387. Again, microcontroller 387 is an Intel R87C196KB with an internal A-D converter. As with the cab electronics, for purposes of clarity, transmitter coupler 381 and receiver coupler 383 are illustrated separately. In actual practice, receiver coupler 383 is, preferably, incorporated into transmitter coupler 381 as an extra winding. While magnetic couplers are preferred, capacitive couplers could, with appropriate modification to the electronics, also be used.

Dolly electronics 323 has to control the air pressure applied to bladder 101 of fifth wheel brake 19. In the embodiment of FIG. 7, this control is chosen to be four discrete pressures. As previously explained, three of the four pressures are pre-set by three regulators 209, 211 and 213, which are connected to electrically operated valves 223, 225 and 227. The fourth, and maximum, pressure is set by regulator 205 and controlled by valve 221. Dolly electronics 323 selects the valve that will apply the commanded pressure to the brake.

With reference to FIG. 11, filter 385 includes the unique combination of conventional D-A converter 389 and a conventional PLL 391, along with smoothing capacitor 393, and coupling capacitor 395. As with PLL 365, PLL 391 includes a frequency determining capacitor 396 and a frequency determining resistor 397 which, as illustrated, is split by the output 398 from D-A convertor 389.

The output of PLL 391 is connected to an A-D input of microcontroller 387 by line 399. Power to D-A converter 389 is supplied via power line 400 which is connected to voltage regulator 401 which, in turn, reduces and stabilizes the voltage of truck battery 363 from 12v. to 5v. Connected between power line 400 and the input of microcontroller 387 is pin switch 64. Connected between power line 400 and an A-D input is pressure transducer 231.

Full line voltage (i.e., 12 volts), via line 402 is used to power transmitter coupler 381. Line 402 is, in turn, coupled to the OUT FREQ terminal of microcontroller 387 via line 403 and field effect transistor (FET) 405.

Microcontroller 387 is also provided with 6 outputs, each of which is connected to a field effect transistor (FET) $407_{1-6}$, as illustrated in FIG. 11. Each FET $407_{1-6}$ is connected to solenoid 221s, 223s, 225s, 227s, 229s, and 230s of air valves 221, 223, 225, 227, 229 and 230.

The particular pressure to be applied to bladder 101 is selected by pushing the desired one of buttons 341. Electronic configuration 321 works such that when a command is entered (by pushing one of buttons $341_{1-4}$), if the command is carried out, the selected push button is lighted (via its associated LED $351_{1-4}$) and the light does not blink. If the command cannot be carried out, the lighted push button 341 blinks, thereby advising the driver that the command cannot be carried out which indicates an equipment malfunction. Note that for a brief period of time between the instant of selecting a new command and the completion of that command, the associated LED $351_{1-4}$ will blink because the commanded pressure and measured fifth wheel dolly brake pressure will be different during the transition.

The signal from the selected one of buttons $341_{1-4}$, constituting a command, is encoded by microcontroller 331 and relayed to dolly electronics 323 via blue wire 325 as previously explained. Dolly electronics 323 decodes the transmitted signal and actuates the required air pressure valve(s). The fifth wheel brake pressure (i.e. pressure in bladder 101) is monitored by transducer 231 that produces an electric signal proportional to the air pressure in bladder 101 and manifold 217. This signal is encoded by microcontroller 387 and transmitted back to cab electronics 321 via line 403, FET 405, line 402, transmitter coupler 381 and line 325. Cab microprocessor 331 decodes the signal returning and compares such received signal with the existing command. If the two are the same, constant power is applied to the LED $351_{1-4}$ in the selected switch $341_{1-4}$ so that it remains on. If the two are different, the LED $351_{1-4}$ in the switch $341_{1-4}$ is caused to blink on and off by interrupting the power to such LED $351_{1-4}$.

As explained above, each command signal to the dolly electronics 323 consists of a short burst square wave signal of the particular frequency that is representative of that command. Dolly microcontroller 387 has to identify the transmitted frequency if it is to correctly respond. Because microcontroller 387 is not very good at directly measuring frequency when the signal is a short burst, to minimize noise contribution and extraneous interference from nearby sources of low frequency radio waves, and to correct for drift, phase locked loop (PLL) 391 is, in conjunction with D-A converter 389 used as a filter and is interposed between line 325 and the microcontroller 387. PLL 391 has a low response to noise and interference, and amplifies the desired signal, all of which identifies it as an excellent frequency selective filter.

PLL 391 contains a voltage controlled oscillator (VCO) whose operating frequency is controlled by an internally generated input voltage. However, measurement of this input voltage of the VCO does not give an exact measure of operating frequency due to the dependence of that voltage on various components whose value changes with temperature and age, creating what is called drift. This drift is corrected through a series of actions that are initiated by part of the program stored in microcontroller 387, in concert with D-A converter 389 and PLL 391. The action proceeds as follows: The input voltage of the VCO that is a part of the PLL is scanned by the A-D converter of microcontroller 387. The time segment of this input voltage identified as the lowest voltage (after averaging) is compared in voltage to a (stored) desired value of approximately 1.5 volts, a value chosen to place all signal voltages within the linear range of PLL 391. If a difference exists, microcontroller 387 initiates an adjustment by changing the digital number sent to D-A converter 389. The output of D-A converter 389, in turn, changes the center frequency of the PLL 391, which causes all signal voltage levels to change. The change is in the direction to reduce the difference between the lowest measured voltage and the stored value. The change is made proportional to the measured difference to assure fastest drift correction. When the difference between the input voltage of the VCO and the stored voltage is reduced enough (to approximately 0.1 volts), no further drift correction signals are generated by microcontroller 387 and command processing proceeds. The foregoing routine assures that the PLL is operating in a linear range and simplified processing of commands is possible.

In the indirect measurement method chosen, cab unit 321 sends out two calibrating frequencies followed by the command. The two calibrating signals are the highest frequency used and the lowest frequency used. Each command is represented by a signal of specific frequency between the two calibrate signal frequencies. The VCO control voltage within the PLL is measured by an A-D converter within microcontroller 387, as explained in the discussion of drift correction. In addition, the relation between the VCO control voltage and the operating frequency of the VCO is nearly linear and the program stored in the dolly microcontroller contains information on the relationship between the calibrate frequencies and the frequencies of the commands. The stored relationships are used to decode the commands.

The sequence transmitted by cab unit 321 is, first the high calibrate frequency (high cal), then the low calibrate frequency (low cal), then the command frequency. The PLL synchronizes with each of these frequencies in turn, as is the nature of phase-locked loops. Synchronization is effected by changing the input voltage of the VCO to cause the VCO to operate at the correct frequency. This means that the three frequencies above result in three voltage levels into the A-D converter. The voltage levels are digitized, then processed by microcontroller 387 under control of its stored program. The processing results in a number assigned to the received signal that represents the position of the command frequency in the band of frequencies between high cal and low cal (e.g., if the computed number is 0.45, the command frequency was determined to be 45% of the way between the low cal and high cal frequencies). Within microcontroller 387, the computed ratio is compared to a stored table from which a command is selected.

An additional use of the calibration frequencies is in synchronizing the respective transmissions of the cab unit and the dolly unit. The time of transmission change from high cal to low cal is detected (by voltage measurement) and used as a time reference point. The stored program has information on how long a time should elapse after the transition from high to low before the dolly unit starts transmitting its response back to the cab unit. When the high-to-low transition is detected, a timer within microcontroller 387 is started. When the timer runs down, the dolly unit transmits.

Dolly microcontroller 387 controls pressure on bladder 101 by activating valves 221, 223, 225 or 227 in response to appropriate commands. The particular valve in the pneumatics illustrated in FIG. 7 to be actuated is selected according to the following rationale. Valve 230 is very infrequently actuated, and only for a short period of time solely for the purpose of purging filters 201 and 203 and will not be discussed further. Exhaust valve 229 is of the type called "normally open" (NO), which means that the valve must be powered to block airflow. Since exhaust valve 229 is NO, if power is shut off, it will open and pressure in bladder 101 will drop to zero (atmospheric). Exhaust valve 229 is activated in normal operation and briefly turned off to lower brake pressure. The other four valves are associated with full line pressure and pressure regulators 209, 211 and 213. A command causes selection of one of the valves to apply one of the preset pressures to bladder 101. When a command is sent that calls for a brake pressure increase, microcontroller 387 responds by turning off the previously commanded valve and turning on the higher pressure related valve. If the new command calls for a decrease in pressure, the microcontroller recognizes that a decrease in pressure is required, turns off the higher pressure valve, opens the exhaust valve briefly to decrease pressure, then switches on the lower pressure valve. Zero (atmospheric) pressure is achieved by turning power off which opens normally open exhaust valve 229, or by presetting one of regulators 209, 211 or 213 to zero pressure or by simply not connecting one valve so that no valve opens on the associated command. Of course microcontroller 387 can be programmed to react to a particular command by not opening any pressure valve and removing power from the exhaust valve which opens the valve.

The brake pressure is monitored by use of pressure transducer 231 that converts varying air pressure to a varying voltage. Microcontroller 387 activates internal A-D converter to measure transducer voltage and selects a frequency of transmission to represent the measured pressure (voltage). The selected frequency is sent back to the cab unit as part of the dolly response cycle.

Receiver coupler 337, cab microcontroller 331 and its associated filter 339 operate in the same manner as receiving coupler 383, filter 385 and microcontroller 387.

To help insure that random noise is not interpreted as a command, which would cause an unwanted pressure change, microcontroller 387 is programmed not to respond tea change in command until it has received the same command in two successive data cycles. Cab microcontroller 331 is also programmed to operate only in response to two successive data cycles from dolly electronics 323.

The two-way transmission of signals on single wire 325 requires that the two units keep synchronized in alternating 100 msec intervals to avoid simultaneous transmission with resulting confusion. To achieve synchronization, the cab unit follows a time sequence of operation that is programmed into dolly microprocessor 387, which time sequence is designed to allow the dolly unit to rapidly synchronize as follows. The time sequence is a repeating 100 msec cycle that has no intrinsic beginning but, for discussion, the cycle will be assumed to start with the high frequency calibrate signal. Cab unit 321 first transmits the high frequency calibrate signal which is the highest frequency in the system. This frequency is transmitted for, approximately, 30 milliseconds. Next, the lowest frequency in the system or low frequency calibrate is sent, again, for approximately 30 milliseconds. During the third 30 millisecond interval, the command is sent to dolly electronics 323. The dolly unit synchronizes by looking for an extreme high signal followed by an extreme low signal. A time mark is taken from the instant of transition from high to low. Dolly microprocessor 387 measures its filter output to recognize this pattern. Adjustment of the filter center frequency, as explained above with regard to drift, may be required before synchronization can be assured. Once synchronization is achieved, the timing of the transition is monitored to maintain synchronization.

During each of its 100 msec transmission intervals, dolly microcontroller 387 sends the following information to cab microcontroller 331: high calibrate (for 25 msec); low calibrate (for 25 msec); the signal representing pressure measured by transducer 231 (for 25 msec); and the signal representing the position (open or closed) of pin switch 64 (for 25 msec). Pin switch 64 position information is encoded after bladder 101 pressure, as one of two frequencies, not related to the five measured pressure response frequencies (each one corresponding to one of the settings of pressure regulators 205, 209, 211, 213 or zero (atmospheric) pressure. The overall signaling sequence on wire 325 is illustrated in FIG. 12.

Because the dolly fifth wheel brake pressure (i.e., the pressure in bladder 101) is monitored, the system of FIG. 8 uses only two valves. When a command is received, the pressure level called for is compared to the measured pressure level. When a difference is detected, the control unit pulses either exhaust air valve 309 to lower brake pressure or supply air valve 303 to increase brake pressure. The pulsing as required is continued until the pressure monitored via transducer 311 and commanded pressure are brought to an acceptably small difference of pressure. This system has the advantage of having fewer parts than that of FIG. 7, but is dependent on the transducer that measures brake air pressure as an essential part of the system.

Whereas the drawings and accompanying description have shown and described the preferred embodiment of the present invention, it should be apparent to those skilled in the art that various changes may be made in the form of the invention without affecting the scope thereof.

What we claim is:

1. A rotatable fifth wheel mechanism, said mechanism including a frame, a fifth wheel, a bearing secured to said frame for rotation relative to said frame about a vertical axis, means for supporting said fifth wheel on said bearing for rotation with said bearing about said vertical axis, means for coupling said fifth wheel to a fifth wheel plate of a semitrailer to prevent relative rotation therebetween, and means secured between said fifth wheel and said frame operable to control rotation of said fifth wheel about said vertical axis, said means to control rotation including a drum secured to one of said fifth wheel and said frame and a clutch means secured to the other of said fifth wheel and said frame, said clutch means including friction means and inflatable bladder means, said friction means completely surrounding said drum (360°), said inflatable bladder means surrounding said friction means for moving said friction means into substantially simultaneous contact with said drum, said inflatable bladder means evenly distributing pressure around said friction means.

2. The fifth wheel mechanism as set forth in claim 1, further including means for selectively pressurizing said inflatable means.

3. The fifth wheel mechanism as set forth in claim 2, wherein said means for selectively pressurizing includes a manifold connected to said inflatable means, and means for increasing and decreasing air pressure in said manifold.

4. The fifth wheel mechanism as set forth in claim 3, wherein said means for increasing and decreasing pressure in said manifold includes a first electronically operated air valve for decreasing pressure in said manifold, and a second electronically operated air valve for increasing pressure in said manifold.

5. The fifth wheel mechanism as set forth in claim 4, wherein said means for increasing pressure includes a third electronically operated air valve.

6. The fifth wheel mechanism as set forth in claim 1, wherein said bearing includes upper and lower rings, and first and second active ball races between said rings and interconnecting said rings.

* * * * *